(12) United States Patent
Hamada et al.

(10) Patent No.: US 8,893,438 B2
(45) Date of Patent: Nov. 25, 2014

(54) WEATHER STRIP, AND ATTACHMENT STRUCTURE OF WEATHER STRIP

(75) Inventors: Yo Hamada, Aichi (JP); Takeyasu Horie, Aichi (JP); Yoshinori Miyake, Saitama (JP)

(73) Assignees: Tokai Kogyo Co., Ltd., Obu (JP); Honda Motor Co., Ltd., Tokyo (JP)

( * ) Notice: Subject to any disclaimer, the term of this patent is extended or adjusted under 35 U.S.C. 154(b) by 627 days.

(21) Appl. No.: 12/697,652

(22) Filed: Feb. 1, 2010

(65) Prior Publication Data

US 2010/0192470 A1    Aug. 5, 2010

(30) Foreign Application Priority Data

Feb. 3, 2009    (JP) .................................. 2009-023089

(51) Int. Cl.
*E06B 7/16*    (2006.01)
*B60J 10/08*    (2006.01)

(52) U.S. Cl.
CPC ....................................... *B60J 10/08* (2013.01)
USPC ......................... 49/490.1; 49/483.1; 49/495.1

(58) Field of Classification Search
USPC ............ 49/490.1, 475.1, 498.1, 495.1, 484.1, 49/483.1
See application file for complete search history.

(56) References Cited

U.S. PATENT DOCUMENTS

| | | | | |
|---|---|---|---|---|
| 4,603,899 A | * | 8/1986 | Iwasa ............................. | 296/154 |
| 4,745,016 A | * | 5/1988 | Hashimoto et al. ........... | 428/122 |
| 4,769,950 A | * | 9/1988 | Ogawa et al. ................ | 49/490.1 |
| 4,848,035 A | * | 7/1989 | Sakuma et al. .............. | 49/490.1 |
| 5,165,201 A | * | 11/1992 | Mishima et al. ............. | 49/490.1 |
| 5,305,553 A | * | 4/1994 | Shimizu et al. .............. | 49/490.1 |
| 5,469,667 A | * | 11/1995 | Le Marrec .................... | 49/477.1 |
| 5,622,008 A | * | 4/1997 | King ............................. | 49/498.1 |
| 5,686,165 A | * | 11/1997 | Cook ............................ | 428/122 |
| 5,840,401 A | * | 11/1998 | Baesecke ..................... | 428/122 |
| 6,245,409 B1 | * | 6/2001 | Cook ............................ | 428/122 |

(Continued)

FOREIGN PATENT DOCUMENTS

| | | |
|---|---|---|
| JP | U-2-51151 | 4/1990 |
| JP | A-8-198031 | 8/1996 |

(Continued)

OTHER PUBLICATIONS

Dec. 26, 2012 Office Action issued in Korean Patent Application No. 10-2010-0009388 (with translation).

(Continued)

*Primary Examiner* — Katherine Mitchell
*Assistant Examiner* — Shiref Mekhaeil
(74) *Attorney, Agent, or Firm* — Oliff PLC

(57) ABSTRACT

A weather strip is provided. The weather strip is arranged so as to intersect a portion joined by overlapping a plurality of panels, and is provided with a tip projection portion which projects onto an extension line of the exterior side wall portion from the tip of an exterior side wall portion of an attachment portion. The tip projection portion is formed from a material which deforms easier than a material forming the sealing portion and is formed in a shape which becomes thin towards a projecting direction with a width dimension which does not exceed the thickness of the tip of the exterior side wall portion in a cross section along the width direction of the attachment portion, and when the attachment portion is attached to the flange, the tip projection portion stretches in the longitudinal direction of the attachment portion and comes into contact with the panels.

14 Claims, 9 Drawing Sheets

STATE BEFORE MOUNTED ON FLANGE

STATE AFTER MOUNTED ON FLANGE (56) References Cited

U.S. PATENT DOCUMENTS

| | | | |
|---|---|---|---|
| 6,247,271 B1* | 6/2001 | Fioritto et al. | 49/490.1 |
| 6,273,433 B1* | 8/2001 | Yu | 277/629 |
| 6,395,371 B1* | 5/2002 | Nozaki et al. | 428/122 |
| 6,520,563 B2* | 2/2003 | Nozaki | 296/146.9 |
| 6,548,143 B1* | 4/2003 | Heller | 428/122 |
| 6,623,014 B1* | 9/2003 | Martin | 277/630 |
| 6,677,020 B2* | 1/2004 | Dron | 428/36.91 |
| 6,837,005 B2* | 1/2005 | Arata et al. | 49/440 |
| 6,849,310 B2* | 2/2005 | Willett | 428/31 |
| 6,874,281 B2* | 4/2005 | Fujita et al. | 49/490.1 |
| 6,948,719 B2* | 9/2005 | Dron | 277/628 |
| 7,685,777 B2* | 3/2010 | Nozaki et al. | 49/498.1 |
| 7,735,263 B2* | 6/2010 | Oba et al. | 49/490.1 |
| 7,934,341 B2* | 5/2011 | Knight et al. | 49/377 |
| 2002/0144466 A1* | 10/2002 | Gopalan et al. | 49/475.1 |
| 2005/0022454 A1* | 2/2005 | Aida et al. | 49/490.1 |
| 2005/0072053 A1* | 4/2005 | Filipczak et al. | 49/490.1 |
| 2005/0193635 A1* | 9/2005 | Hemauer | 49/490.1 |
| 2005/0235572 A1* | 10/2005 | Kamei et al. | 49/490.1 |
| 2006/0143988 A1* | 7/2006 | Dillmann | 49/498.1 |
| 2006/0218866 A1* | 10/2006 | Whitehead | 49/490.1 |
| 2006/0272217 A1* | 12/2006 | Gopalan | 49/490.1 |
| 2007/0084127 A1* | 4/2007 | Muraoka et al. | 49/490.1 |
| 2007/0193120 A1* | 8/2007 | Tessier et al. | 49/490.1 |
| 2008/0000165 A1* | 1/2008 | Ochiai | 49/490.1 |
| 2008/0000166 A1* | 1/2008 | Whitehead | 49/490.1 |
| 2009/0100761 A1* | 4/2009 | Hashimoto et al. | 49/475.1 |
| 2009/0266000 A1* | 10/2009 | Minoura et al. | 49/490.1 |
| 2010/0263292 A1* | 10/2010 | Harland | 49/475.1 |
| 2011/0167732 A1* | 7/2011 | Brancaleone et al. | 49/475.1 |
| 2011/0219699 A1* | 9/2011 | Miyakawa et al. | 49/490.1 |
| 2012/0023831 A1* | 2/2012 | Matsumoto et al. | 49/489.1 |
| 2012/0031009 A1* | 2/2012 | Iwasa et al. | 49/490.1 |
| 2012/0060424 A1* | 3/2012 | Willett | 49/490.1 |
| 2012/0073209 A1* | 3/2012 | Otsuka et al. | 49/489.1 |

FOREIGN PATENT DOCUMENTS

| | | |
|---|---|---|
| JP | A-11-208278 | 8/1999 |
| JP | A-2001-341590 | 12/2001 |
| JP | A-2002-166797 | 6/2002 |
| JP | A-2003-320905 | 11/2003 |
| JP | A-2003-320906 | 11/2003 |
| JP | A-2004-114973 | 4/2004 |
| JP | A-2005-47448 | 2/2005 |
| JP | A-2006-7842 | 1/2006 |
| JP | A-2007-261567 | 10/2007 |
| JP | A-2008-7031 | 1/2008 |
| JP | 2008-230258 A | 10/2008 |

OTHER PUBLICATIONS

Japanese Final Rejection dated Sep. 20, 2013 from Japanese Patent Application No. 2009-023089 (with English-language translation).
Notification of Reasons for Refusal dated Dec. 26, 2012 from Japanese Patent Application No. 2009-023089 (with English-language translation).

* cited by examiner

STATE BEFORE MOUNTED ON FLANGE

FIG. 5

STATE AFTER MOUNTED ON FLANGE

FIG. 6

A-A SECTIONAL VIEW

FIG. 7

STATE BEFORE COMPRESSIVE DEFORMATION

FIG. 8

STATE AFTER BEING BROUGHT INTO CONTACT
WITH SIDE PANEL AND COMPRESSIVELY DEFORMED

FIG. 9

STATE AFTER BEING BROUGHT INTO CONTACT
WITH ROOF PANEL AND COMPRESSIVELY DEFORMED

WEATHER STRIP, AND ATTACHMENT STRUCTURE OF WEATHER STRIP

CROSS REFERENCE TO RELATED APPLICATION

The present application claims priority from Japanese Patent Application No. 2009-023089, which was filed on Feb. 3, 2009, the disclosure of which is herein incorporated by reference in its entirety.

TECHNICAL FIELD

Apparatuses and devices consistent with the present invention relate to a long weather strip made of a polymer material which seals a circumferential edge of a vehicle body and a lid, and an attachment structure of the weather strip.

BACKGROUND

Generally, a flange which is provided at the circumferential edge of an opening, such as a door opening or a trunk opening of a car, etc. is mounted with a weather strip so that a gap between the circumferential edge of the opening, and a lid, such as a door or a trunk lid which closes the opening, is sealed by the weather strip.

As such a weather strip, for example, as shown in Patent Document 1 (JP-A-2004-114973), there is a weather strip comprising; an attachment portion attached to a flange at the circumferential edge of an opening and having a substantially U-shaped cross-section and a hollow sealing portion made of a polymer material which are integrally formed, and a lip-like sealing portion which extends slantingly inward from the tip of an exterior side wall portion of the attachment portion is provided, and when the attachment portion is attached to the flange at the circumferential edge of the opening, the lip-like sealing portion is bent so as to come into contact with a panel.

[Patent Document 1] JP-A-2004-114973 (FIG. 1, FIG. 5, etc.)

SUMMARY

Meanwhile, a vehicle body of a car is formed, for example, by joining together a plurality of panels, such as a roof panel or side panels. And, a weather strip mounted on a flange at the circumferential edge of an opening of a vehicle body may be arranged so as to intersect a portion joined by overlapping the plurality of panels.

However, in the weather strip of the above Patent Document 1, the lip-like sealing portion provided at the tip of the exterior side wall portion of the attachment portion is bent at its proximal portion, and comes into contact with a panel. Therefore, in a case where the weather strip is arranged so as to intersect the portion joined by overlapping the plurality of panels, the lip-like sealing portion cannot be brought into close contact with a portion formed by joining the panels together so as to follow the height difference of the portion, and a gap may be generated between the lip-like sealing portion and the panel at the portion formed by joining the panels together, and water, such as rain water, may enter the car from the gap.

Additionally, if the lip-like sealing portion is made long or made thick in order to increase the force of contact of the lip-like sealing portion with the panel, there is a disadvantage. For example, when attaching the attachment portion to the flange at the circumferential edge of the opening, since an elastic repulsive force, when the lip-like sealing portion come into contact with the panels and bending deformation occurs, becomes larger, it becomes difficult to attach the attachment portion to the flange, and the mountability of the weather strip may deteriorate.

Accordingly, it is an aspect of the present invention to improve the sealing performance of a portion formed by joining panels together without deteriorating the mountability of a weather strip.

According to an illustrative aspect of the invention, there is provided a long weather strip made of a polymer material comprising: an attachment portion formed in a shape having an exterior side wall portion, an interior side wall portion, and a base bottom portion connecting together both the side wall portions so as to be attached to a flange provided along the circumferential edge of an opening of a vehicle body formed by a plurality of panels, and a sealing portion provided at one of the side wall portions or the base bottom portion of the attachment portion, and being arranged between the circumferential edge of the opening and a lid capable of opening/closing the opening to seal a gap between the circumferential edge of the opening and the lid, wherein the weather strip is arranged so as to intersect a portion joined by overlapping the plurality of panels, and is provided with a tip projection portion which projects onto an extension line of the exterior side wall portion from the tip of the exterior side wall portion of the attachment portion, wherein the tip projection portion is formed from a material which deforms more easily than a material forming the sealing portion, and the tip projection portion is formed in a shape which becomes thin towards a projecting direction with a width dimension which does not exceed the thickness of the tip of the exterior side wall portion in a cross section along the width direction of the attachment portion, and when the attachment portion is attached to the flange, the tip projection portion comes into contact with the panels from its tip, and compressively deforms gradually in the projecting direction so as to be broadened in the width direction of the attachment portion so that a width dimension after deformation becomes greater than a width dimension before the deformation, and the tip projection portion stretches in the longitudinal direction of the attachment portion and comes into contact with the panels, is provided.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Hereinafter, one exemplary embodiment of the present invention will be described with reference to the accompanying drawings.

Figure 1:
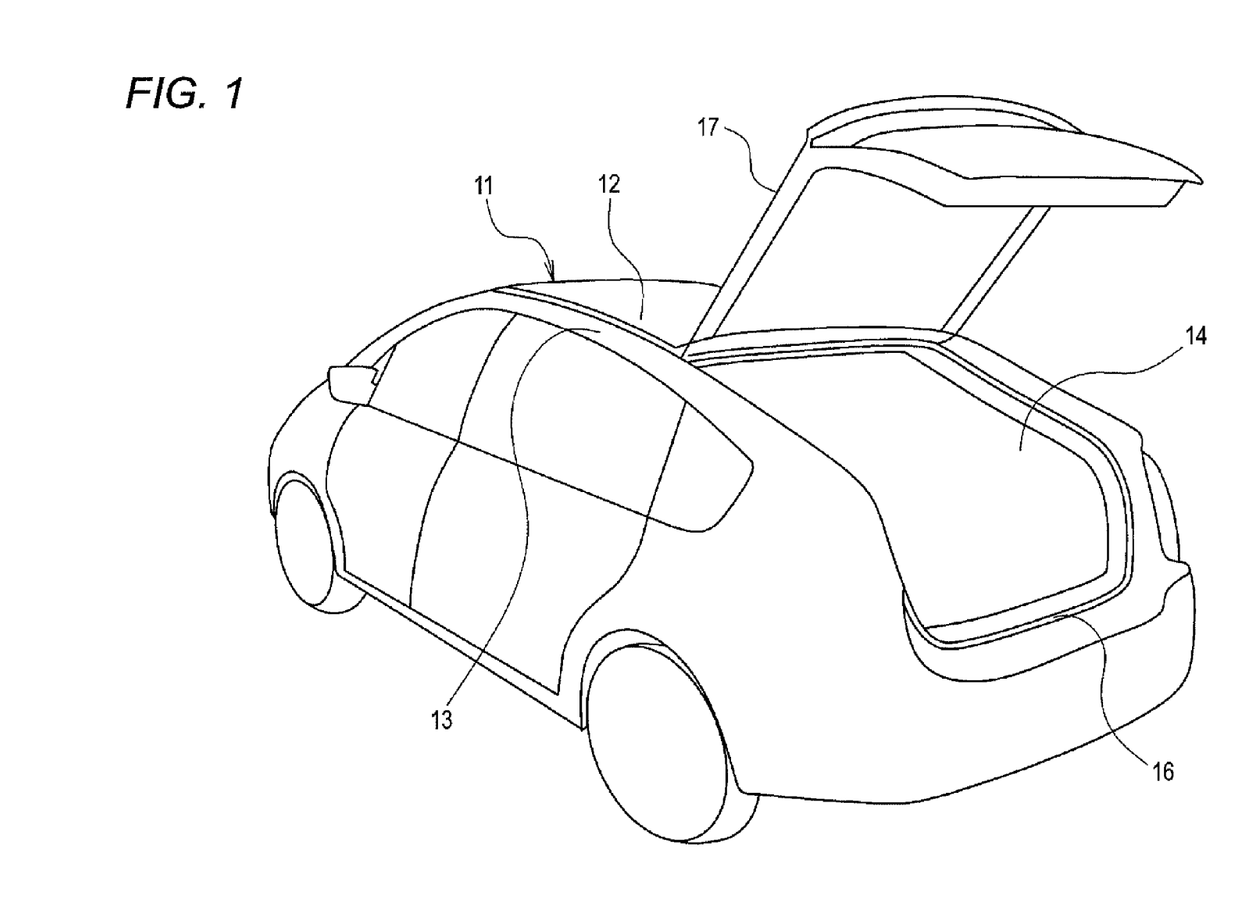
FIG. 1 is a perspective view illustrating a vehicle mounted with a weather strip in an embodiment of the invention along a circumferential edge of a back door opening.

As shown in FIG. 1, a vehicle body 11 of a car is formed by connecting together a plurality of panels, such as a roof panel 12 and side panels 13. A flange 15 (refer to FIG. 5) is provided along the circumferential edge of a back door opening 14 of this vehicle body 11. And a long weather strip 16 made of a polymer material is mounted along the flange 15, and the weather strip 16 is provided to seal a gap between the circumferential edge of the back door opening 14 and an openable/closable back door 17 (lid) which closes the back door opening 14.

Figure 2:
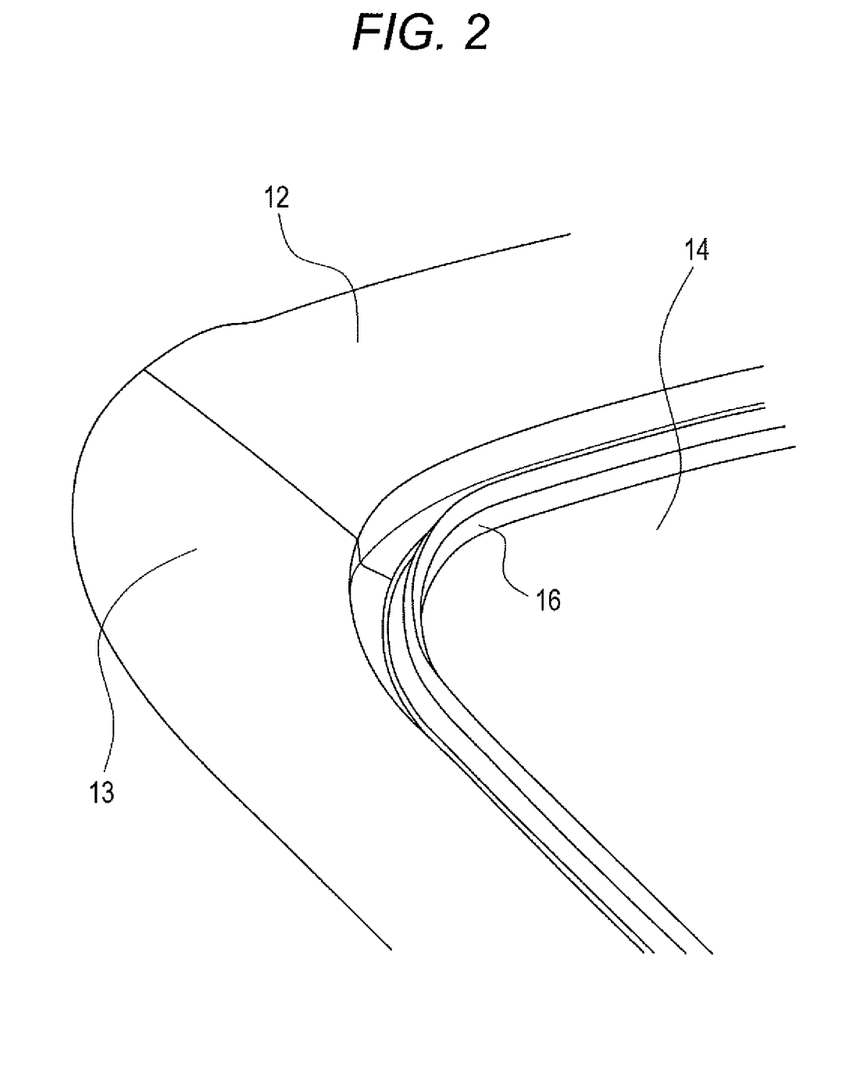
FIG. 2 is a perspective view illustrating a portion which connects a roof panel and a side panel, which are superimposed, and its peripheral area.

As shown in FIG. 2, the roof panel 12 and the side panels 13 are connected together by superimposing the side panels on both the right and left side portions, respectively, of the roof panel 12 to join the panels together by spot welding, etc. The weather strip 16 mounted on the flange 15 of the circumferential edge of the back door opening 14 is arranged so as to intersect portions connected by overlapping the roof panel 12 and the side panels 13.

Figure 6:
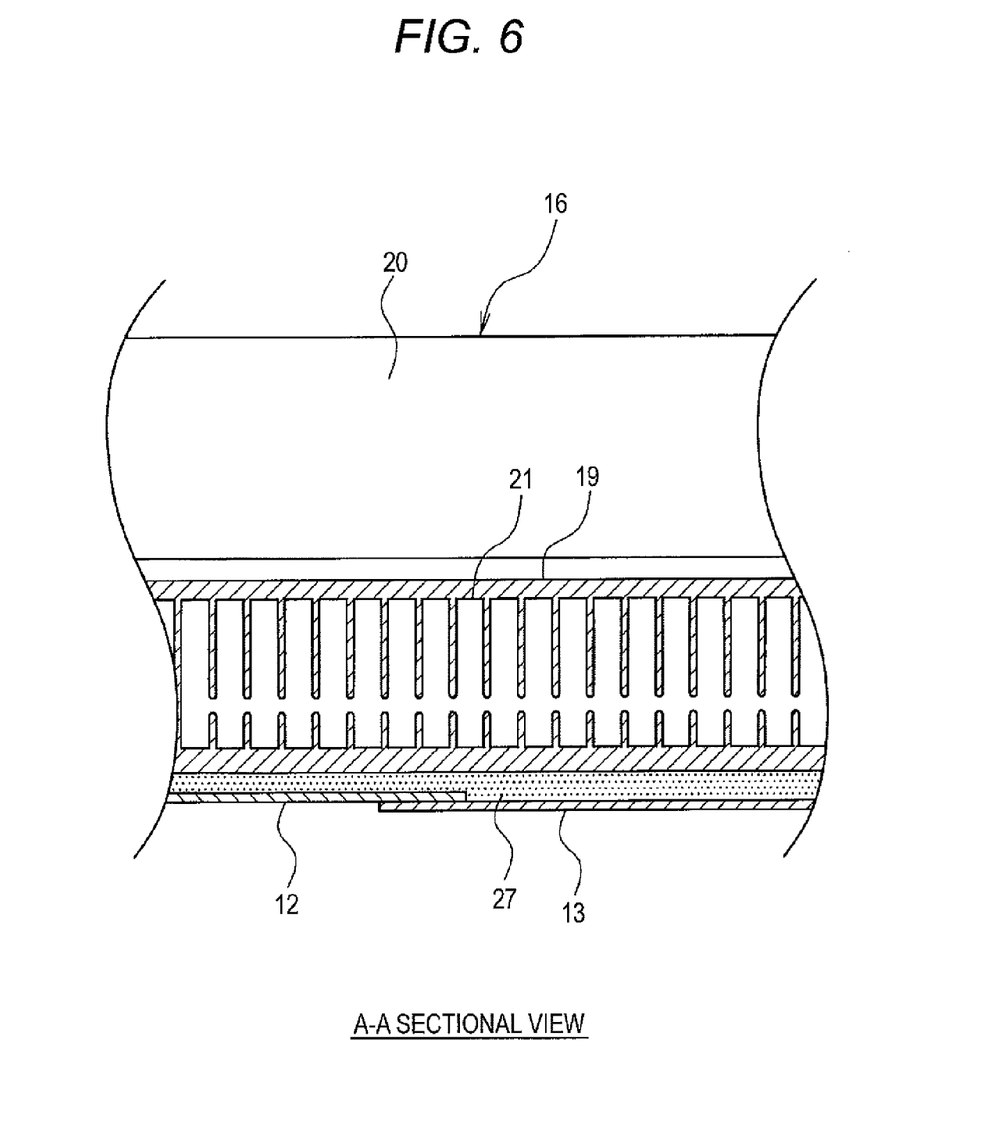
FIG. 6 is a cross-sectional view taken along the line A-A in FIG. 5.

Here, a method of joining together the roof panel 12 and the side panels 13, for example, is superimposing the side edges of the roof panel 12 on the top faces of the side edges of the side panels 13, thereby joining the side edges and the top faces together so that a height difference is caused between the roof panel 12 and each side panel 13 (refer to FIG. 6). Alternatively, joining portions which are made to retreat in a bottom face direction by the thickness of a panel with respect to a panel body may be formed in advance at the side edges of the side panels 13, and the side edges of the roof panel 12 may be superimposed on the top faces of the joining portions so that a height difference is not caused between the roof panel 12 and each side panel 13. Additionally, a putty-like or pasty sealant (a waterproofing agent or a filler) having urethane resin, silicone, etc., as main components may be coated and solidified on portions which connects the roof panel 12 and the side panels 13 together so as to fill up a joint between the roof panel 12 and each side panel 13.

Next, the weather strip 16 and its attachment structure will be described with reference to FIGS. 3 to 9.

Figure 3:
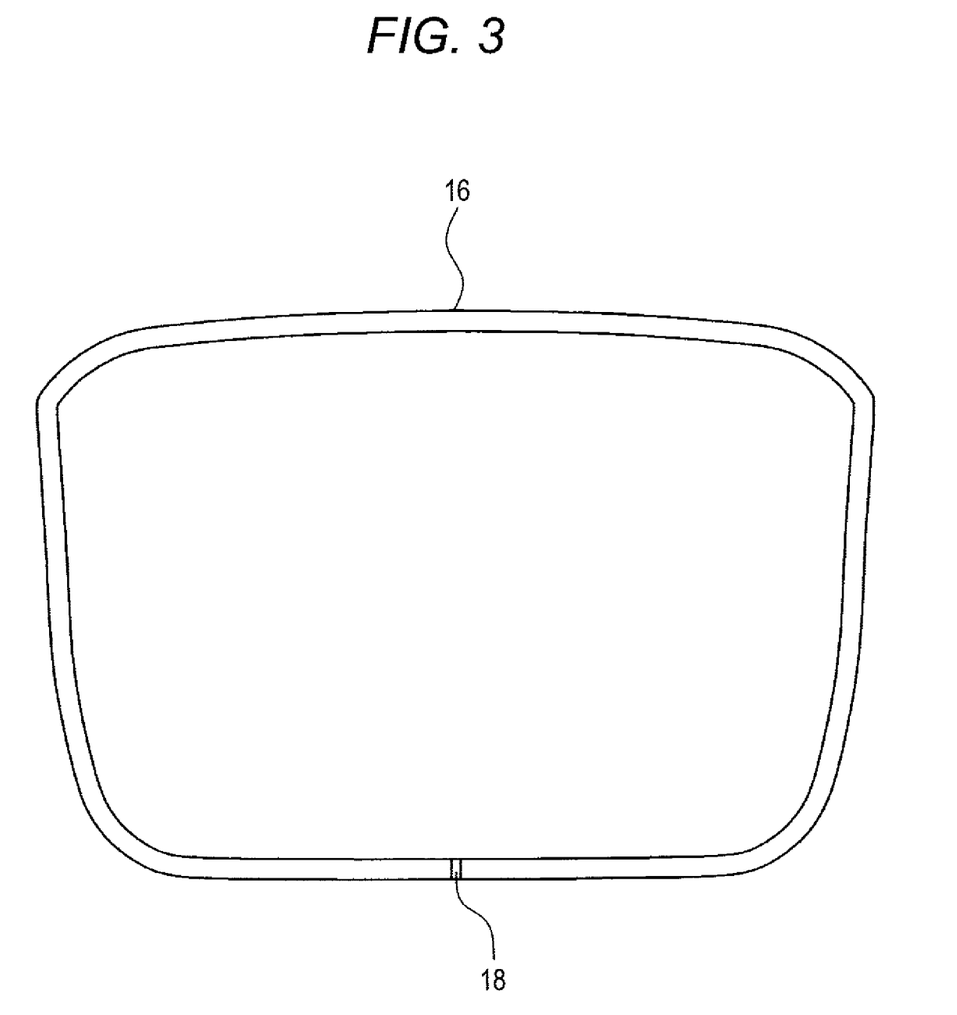
FIG. 3 is a front view of a weather strip.

As shown in FIG. 3, the weather strip 16 mounted on the flange 15 of the circumferential edge of the back door opening 14 is annularly formed by connecting end portions of one weather strip extrusion-molded component which is substantially straightly formed by extrusion molding. Here, a connecting method of the weather strip 16, for example, is performed by injection-molding a connecting portion 18 which connects end portions of a weather strip extrusion-molded component. Alternatively, the end portions of the weather strip extrusion-molded component may be connected together by a joining sheet member. In addition, the weather strip 16 may be formed not by connecting end portions of one weather strip extrusion-molded component, but simply by butting the end portions against each other.

Figure 4:
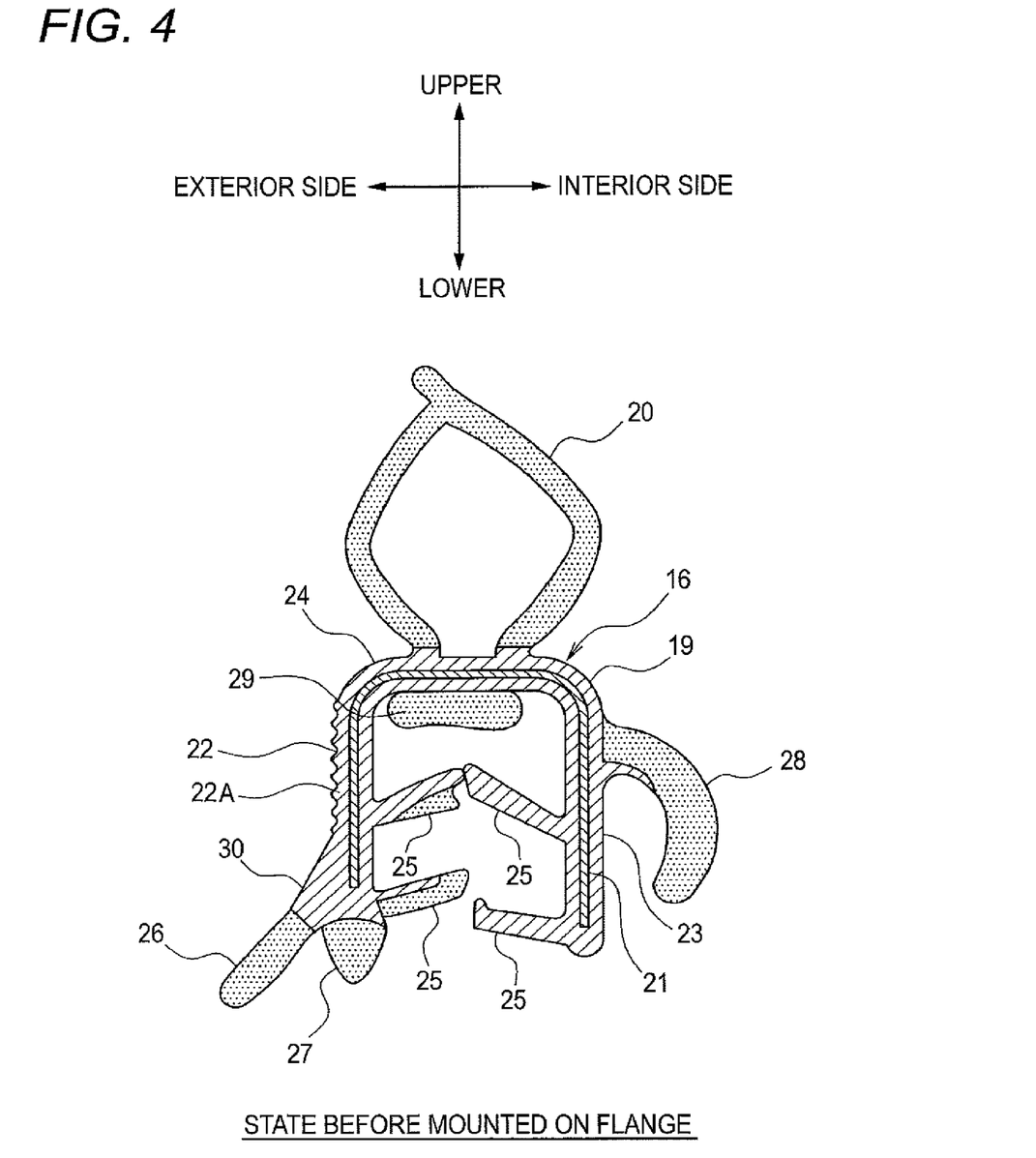
FIG. 4 is a cross-sectional view of a weather strip before being mounted on a flange.
Figure 5:
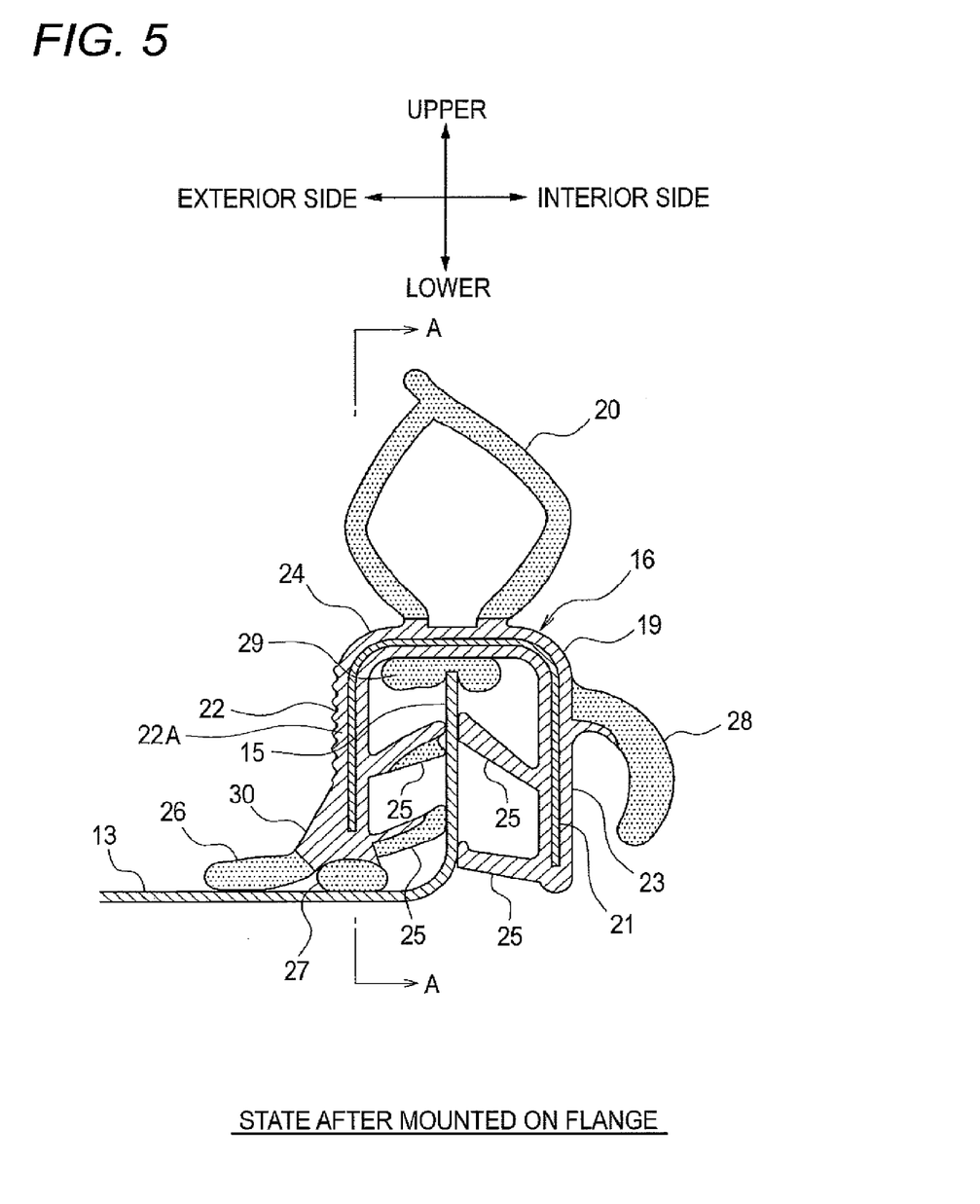
FIG. 5 is a cross-sectional view of a weather strip after being mounted on a flange.

As shown in FIGS. 4 and 5, in the weather strip 16, an attachment portion 19 having a substantially U-shaped cross-section, and a tubular hollow sealing portion 20 made of a sponge material are integrally formed by extrusion-molding elastic polymer materials, such as rubber and thermoplastic synthetic resin (including thermoplastic elastomer). Additionally, a core 21 formed from metallic sheet or resin sheet is buried in the attachment portion 19 by insert extrusion molding (also referred to as combined extrusion molding).

The attachment portion 19 has an exterior side wall portion 22, an interior side wall portion 23, and a base bottom portion 24 which connects together both side wall portions 22 and 23, and holding lips 25 which project in directions opposite to each other are integrally formed on the internal surface of the exterior side wall portion 22 and the internal surface of the interior side wall portion 23 in the attachment portion 19. In the present exemplary embodiment, two holding lips 25 are formed on the exterior side wall portion 22 and the interior side wall portion 23, respectively, and portions of the holding lips 25 of the exterior side wall portion 22 are formed from a sponge material. The core 21 buried in the attachment portion 19 extends to the vicinities (the vicinities where the holding lips 25 on the tip sides are formed) of the tips of both the side wall portions 22 and 23, and the attachment portion 19 is reinforced by the core 21 so that the attachment portion 19 can be stably fixed to the flange 15.

As shown in FIG. 5, when the attachment portion 19 of the weather strip 16 covers and is attached to the flange 15 of the circumferential edge of the back door opening 14, the holding lips 25 elastically deforms to sandwich the flange 15 from both the exterior and interior sides, whereby the weather strip 16 is mounted on the flange 15. Also, when the back door 17 is closed, the back door 17 comes into contact with the tubular hollow sealing portion 20 to elastically deform the tubular hollow sealing portion 20 so that a gap between the back door 17 and each side panel 13 (or the roof panel 12) is sealed by the tubular hollow sealing portion 20.

Additionally, a seal lip 26 made of a sponge material, which projects towards the exterior side, is integrally formed on the external surface of the exterior side wall portion 22 of the attachment portion 19, and a tip projection portion 27 made of a sponge material, which projects onto an extension line of the exterior side wall portion 22, is integrally formed at the tip of the exterior side wall portion 22 of the attachment portion 19. When the weather strip 16 has been mounted on the flange 15, the seal lip 26 comes into contact with the side panel 13 (or the roof panel 12) and elastically deforms (bending deformation), and the tip projection portion 27 comes into contact with the side panel 13 (or the roof panel 12) and elastically deforms (compressive deformation) so that a gap between the exterior side wall portion 22 of the attachment portion 19 and each side panel 13 (or the roof panel 12) is sealed by the seal lip 26 and the tip projection portion 27.

Meanwhile, a concealing lip 28 made of a sponge material, which projects towards the interior side and of which the tip is bent towards the attachment portion 19, is integrally formed on the external surface of the interior side wall portion 23 of the attachment portion 19. When the weather strip 16 is mounted on the flange 15, the end portion of an interior member (not shown) within a car is inserted between the concealing lip 28 and the interior side wall portion 23 of the attachment portion 19 so as to be covered with the concealing lip 28.

Additionally, a water-stop portion 29 made of a sponge material is integrally formed on the internal surface of the base bottom portion 24 of the attachment portion 19, and when the weather strip 16 is mounted on the flange 15, the water-stop portion 29 comes into contact with the tip of the flange 15, and thereby, the water-stop portion 29 elastically deforms (compressive deformation) so that a gap between the attachment portion 19 and the flange 15 is sealed by the water-stop portion 29.

In the weather strip 16, a main portion (the exterior side wall portion 22, the interior side wall portion 23, and the base bottom portion 24) of the attachment portion 19 is formed from solid rubber materials, such as an EPDM solid material. Additionally, the tubular hollow sealing portion 20, the seal lip 26, and the concealing lip 28 are formed from sponge rubber materials, such as an EPDM sponge material of which the specific gravity is smaller than the solid rubber material (solid rubber material which forms the main portion of the attachment portion 19). In addition, although the holding lip 25 is formed from the same solid rubber material as the main portion of the attachment portion 19, portions of the holding lips 25 of the exterior side wall portion 22 is formed from the same sponge rubber material as the tubular hollow sealing portion 20. Moreover, the tip projection portion 27 and the water-stop portion 29 are formed from sponge rubber materials, such as an EPDM sponge material of which the specific gravity is smaller than the above sponge rubber material (sponge rubber material which forms the tubular hollow sealing portion 20).

Specifically, the main portion of the attachment portion 19 is formed from a solid rubber material of which the specific gravity is 0.8 to 1.3 (preferably 1.1), the tubular hollow sealing portion 20 is formed from a sponge rubber material of which the specific gravity is 0.55 to 0.65 (preferably 0.6), and the tip projection portion 27 is formed from a sponge rubber material of which the specific gravity is 0.3 to 0.4 (preferably 0.35). Thereby, the tubular hollow sealing portion 20 deforms more easily than the main portion of the attachment portion 19, and the tip projection portion 27 deforms more easily than the tubular hollow sealing portion 20.

Figure 7:
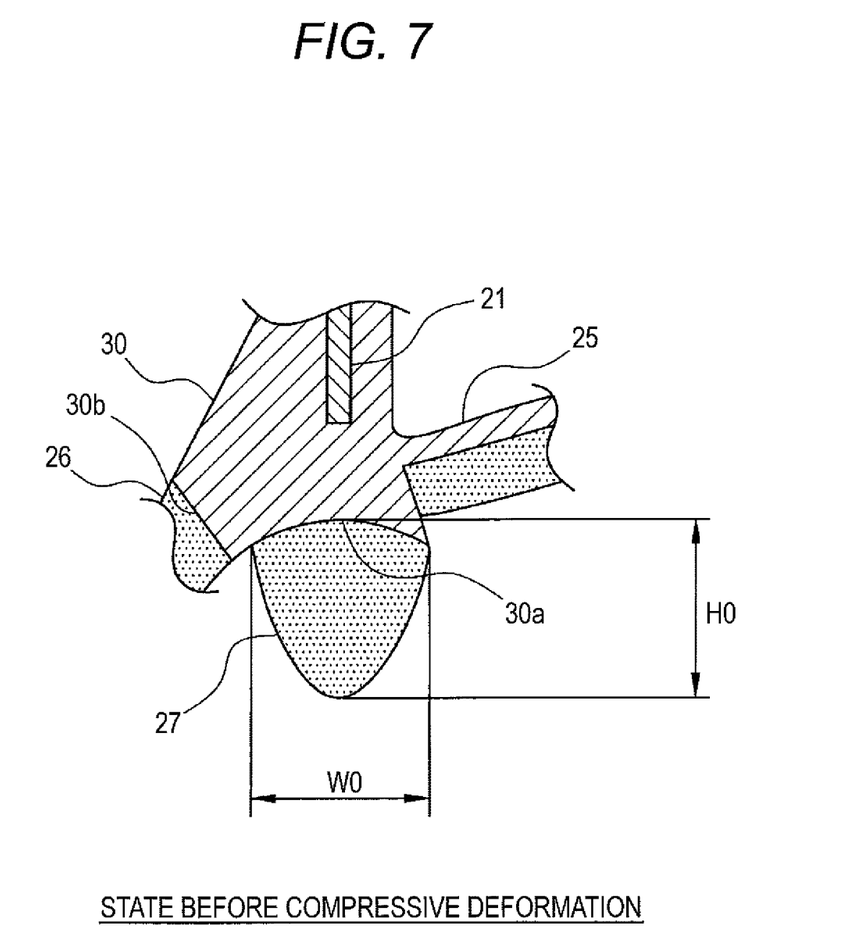
FIG. 7 is an enlarged cross-sectional view illustrating a tip projection portion before a compressive deformation, and its peripheral area.

As shown in FIG. 7, the tip of the exterior side wall portion 22 is formed with a joining portion 30 joined to the tip projection portion 27. The joining portion 30 has a dimension which is thicker than a main portion 22a of the exterior side wall portion 22 in a cross section along the width direction of the attachment portion 19, and is formed in a shape such that the joining portion 30 becomes thick towards the tip projection portion 27 in a cross section along the width direction of the attachment portion 19. Additionally, the joining portion 30 is formed in the shape of a curved shape such that a joining surface 30a thereof joined to the tip projection portion 27 is curved in a recessed shape. By forming the joining portion 30 at the tip of the exterior side wall portion 22 thicker than the main portion 22a of the exterior side wall portion 22, the joining portion 30 hardly deforms. Additionally, by forming the joining portion 30 in the shape of a curved surface such that the joining surface 30a with the tip projection portion 27 is curved in a recessed shape, the area of joining between the joining portion 30 and the tip projection portion 27 can be increased, and the tip projection portion 27 can be reliably and stably held by the joining portion 30 at the tip of the exterior side wall portion 22. Additionally, the joining portion 30 is formed in a shape of a slant surface such that a joining surface 30b thereof joined to the seal lip 26 slants toward a projecting direction of the seal lip 26.

Meanwhile, as shown in FIG. 7, the tip projection portion 27 is formed in a substantially triangular shape (a substantially triangular shape which is curved such that its tip is made round and three sides swell) which becomes thin towards the projecting direction with a width dimension which does not exceed the thickness (a width dimension in the vicinity of the joining surface 30a) of the joining portion 30 at the tip of the exterior side wall portion 22 in a cross section along the width direction of the tip projection portion 27. Then, when the attachment portion 19 is attached to the flange 15, the tip projection portion 27 comes into contact with the side panel 13 (or the roof panel 12) from the tip of the tip projection portion 27, and compressively deforms gradually in the projecting direction so that, as shown in FIGS. 8 and 9, the tip projection portion 27 comes into contact with the side panel 13 (or the roof panel 12) in a state where the tip projection portion is broadened along the width direction of the attachment portion 19, and the tip projection portion 27 comes into contact with the side panel 13 (or the roof panel 12) in a state where the tip projection portion has stretched even in the longitudinal direction of the attachment portion 19.

Figure 8:
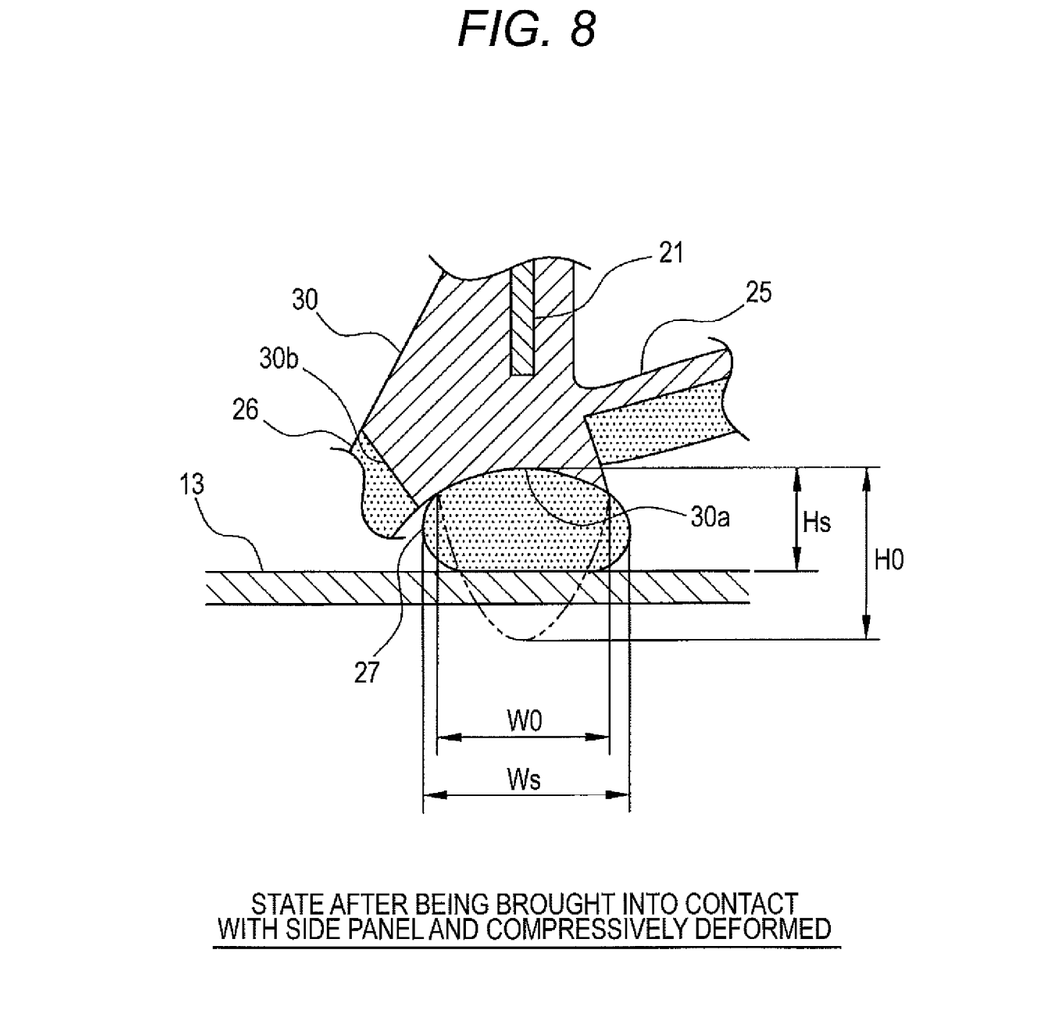
FIG. 8 is an enlarged cross-sectional view illustrating a tip projection portion after coming into contact with a side panel and deforming compressively, and its peripheral area.

In this case, as shown in FIG. 8, in the portion of the tip projection portion 27 which comes into contact with the side panel 13 and compressively deforms, a height dimension Hs after the compressive deformation of the tip projection portion 27 becomes smaller than a height dimension H0 before the compressive deformation (Hs<H0), and a width dimension Ws after the compressive deformation of the tip projection portion 27 becomes greater than a width direction W0 before the compressive deformation (Ws>W0).

Figure 9:
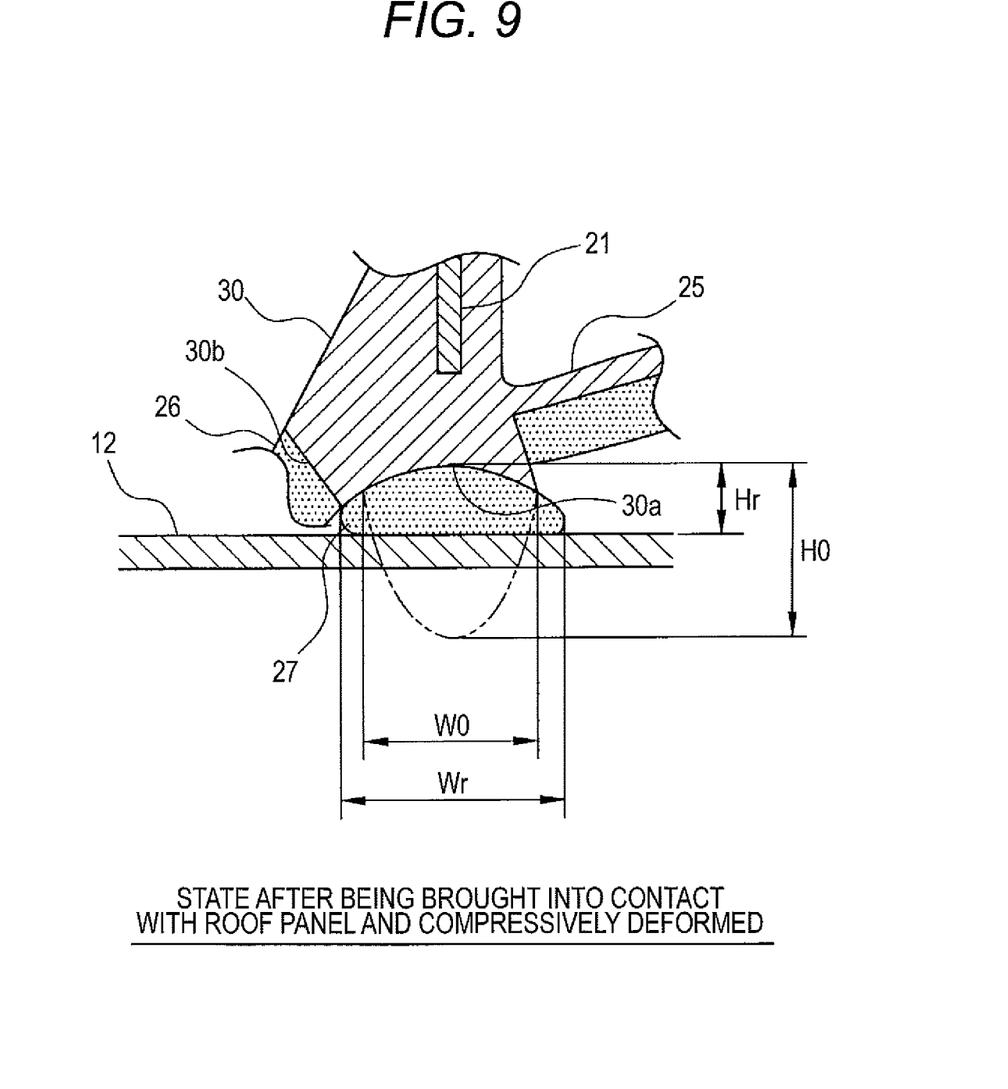
FIG. 9 is an enlarged cross-sectional view illustrating a tip projection portion after coming into contact with a roof panel and deforming compressively, and its peripheral area.

Moreover, as shown in FIG. 9, in the portion of the tip projection portion 27 which comes into contact with the roof panel 12 superimposed on the side panel 13 and compressively deforms, a height dimension Hr after the compressive deformation of the tip projection portion 27 becomes smaller than Hs (Hr<Hs<H0), and a width dimension Wr after the compressive deformation of the tip projection portion 27 becomes greater than Ws (Wr>Ws>W0).

Additionally, as shown in FIG. 7, the tip projection portion 27 is formed in the shape of a substantially triangular shape which is line-symmetric in the width direction in a cross section so that, when the tip projection portion 27 has compressively deformed in the projecting direction, the tip projection portion 27 can be broadened substantially equally in the width direction, and the tip projection portion 27 can be reliably prevented from being toppled or bent. Moreover, the tip projection portion 27 is formed such that the width dimension W0 and height dimension H0 before its compressive deformation become 1:1 so that it is possible to secure sufficient wall thickness in the projecting direction in bringing the tip projection portion 27 into close contact with the side panel 13 (or the roof panel 12) while the tip projection portion 27 is reliably prevented from being toppled or bent. Additionally, the tip projection portion 27 is enabled to compressively deform more than a height difference (refer to FIG. 6) of the portion joined by overlapping the roof panel 12 and the side panel 13 so that the tip projection portion 27 can be brought into close contact with the portion formed by joining together the panels 12 and 13 so as to reliably follow the height difference of the portion, and favorable sealing performance can be ensured.

In the exemplary embodiment described above, the tip projection portion 27 which projects onto an extension line of the exterior side wall portion 22 from the joining portion 30 at the tip of the exterior side wall portion 22 of the attachment portion 19 is provided, and the tip projection portion 27 is formed in a substantially triangular shape which becomes thin towards the projecting direction with a width dimension which does not exceed the thickness of the joining portion 30 at the tip of the exterior side wall portion 22. Thus, when the attachment portion 19 is attached to the flange 15, the tip projection portion 27 is not toppled or bent, and the tip projection portion 27 compressively deforms in the projecting direction and comes into contact with the side panel 13 (or roof panel 12). Therefore, the tip projection portion 27 can be brought into close contact with the portion joined by overlapping the roof panel 12 and the side panel 13 so as to sufficiently follow the height difference of the portion. Thereby, a gap can be prevented from being generated between the tip projection portion 27 and the panels 12 and 13 at the portion joined by overlapping the roof panel 12 and the side panel 13 so that rain water can be prevented from entering the car, and the sealing performance of the portion formed by joining together the panels 12 and 13 can be improved.

Moreover, since the tip projection portion 27 is formed from a material which deforms more easily than the tubular hollow sealing portion 20, when the attachment portion 19 is attached to the flange 15 of the circumferential edge of the back door opening 14, the elastic repulsive force when the tip projection portion 27 has come into contact with the side panel 13 (or the roof panel 12) and has compressively deformed becomes small, the attachment portion 19 is easily attached to the flange 15, and the mountability of the weather strip 16 can be ensured.

Meanwhile, in the weather strip (the weather strip of the above Patent Document 1) provided with the lip-like sealing portion which extends slantingly inward from the tip of the exterior side wall portion of the attachment portion, if the lip-like sealing portion is made long in order to increase the force of contact of the lip-like sealing portion with the panel (to ensure sealing performance), a foaming rubber material which forms the sealing portion is more easily foamed at a distal portion of the lip-like sealing portion than a proximal portion thereof when the weather strip is extrusion-molded, and the volume expansion rate increases. Therefore, there is a possibility that the undulation may occur in which the lip-like sealing portion undulates in the longitudinal direction.

In that respect, in the exemplary embodiment, the lip-like sealing portion which extends slantingly inward from the tip of the exterior side wall portion of the attachment portion is omitted, and the tip projection portion 27 which projects onto an extension line of the exterior side wall portion 22 from the joining portion 30 at the tip of the exterior side wall portion 22 of the attachment portion 19 is provided. Thus, even if the tip projection portion 27 is not made so long, the sealing performance can be ensured, and occurrence of the aforementioned undulation can be prevented.

In addition, in the above exemplary embodiment, the tip projection portion 27 is formed such that the width dimension and the height dimension become 1:1 in a substantially triangular shape which is line-symmetric in the width direction in a cross section. However, the shape of the tip projection portion is not limited to this, and may be suitably changed. For example, the tip projection portion 27 may be formed in a substantially trapezoidal shape or a substantially semi-circular shape in a cross section, or the tip projection portion 27 may be formed in a shape which is non-symmetrical in the width direction in a cross section.

Additionally, in the above exemplary embodiment, the joining surface 30a between the joining portion 30 at the tip of the exterior side wall portion 22 and the tip projection portion 27 is curved in a recessed shape. However the joining surface is not limited to this. For example, the joining surface 30a between the joining portion 30 and the tip projection portion 27 may be formed in a straight line.

Additionally, in the above exemplary embodiment, the invention has been applied to the weather strip 16 in which the base bottom portion 24 of the attachment portion 19 is provided with the tubular hollow sealing portion 20. However, the shapes of the respective portions of the weather strip may be suitably changed like a case where the invention may be applied to a weather strip in which a side wall portion of the attachment portion is provided with a hollow sealing portion, or a case where the invention may be applied to a weather strip in which the side wall portion or base bottom portion of the attachment portion is provided with a non-hollow sealing portion having no hollow portion.

As described above, various modifications and changes to the invention can be made. That is, the invention is not limited to the weather strip mounted on the circumferential edge of the back door opening of the vehicle body. For example, the invention may be applied to weather strips mounted on the circumferential edges of various openings of a vehicle body, such as a front door opening, rear door opening, and trunk opening of the vehicle body.

What is claimed is:

1. A weather strip made of a polymer material comprising:
    an attachment portion formed in a shape having an exterior side wall portion, an interior side wall portion, and a base bottom portion connecting together both the side wall portions so as to be attached to a flange provided along the circumferential edge of an opening of a vehicle body formed by a plurality of panels;
    a sealing portion provided at one of the side wall portions or the base bottom portion of the attachment portion, and
    the sealing portion being arranged between the circumferential edge of the opening and a lid capable of opening and closing the opening of the vehicle body to seal a gap between the circumferential edge of the opening and the lid,
    wherein the weather strip is arranged so as to intersect a portion joined by overlapping the plurality of panels, and is provided with a tip projection portion which projects onto an extension line of the exterior side wall portion from the tip of the exterior side wall portion of the attachment portion,
    wherein the tip projection portion is formed from a material which can deform more easily than a material forming the sealing portion, and the tip projection portion is formed in a shape which becomes thin towards a projecting direction with a width dimension which does not exceed the thickness of the tip of the exterior side wall portion in a cross section along the width direction of the attachment portion,
    wherein the tip of the exterior side wall portion is formed with a joining portion that includes a joining surface joined to the tip projection portion,
    wherein the projecting direction is the same as a direction in which the weather strip is attached to the flange,
    wherein the joining surface and the tip projection portion extend both more interior and more exterior, in a width direction of the exterior side wall portion, than a main portion of the exterior side wall portion,
    when the attachment portion is attached to the flange, the tip projection portion comes into contact with the panels from its tip, and compressively deforms gradually in the projecting direction so as to be broadened in the width direction of the attachment portion so that a width dimension after deformation becomes greater than a width dimension before the deformation, and the tip projection portion stretches in the longitudinal direction of the attachment portion and comes into contact with the panels.

2. The weather strip according to claim 1,
    wherein the tip projection portion is formed so that the width dimension and a height dimension thereof becomes 1:1 in cross section.

3. The weather strip according to claim 1,
wherein the tip projection portion is formed in a shape which is line-symmetric in the width direction in cross section.

4. The weather strip according to claim 1,
wherein the tip projection portion is formed in a triangular shape which becomes thin towards the projecting direction in cross section.

5. The weather strip according to claim 1,
wherein a rubber material forming the sealing portion has a smaller specific gravity than a rubber material forming a main portion of the attachment portion, and a rubber material forming the tip projecting portion has a smaller specific gravity than the rubber material forming the sealing portion.

6. The weather strip according to claim 1,
wherein the tip of the exterior side wall portion is formed so that the surface thereof joined to the tip projection portion is curved in a recessed shape in cross section.

7. The weather strip according to claim 1,
wherein the tip projection portion is enabled to compressively deform more than the height difference of a portion joined by overlapping the plurality of panels.

8. The weather strip according to claim 1, further comprising a seal lip that projects toward an exterior side of the weather strip and projects downward,
wherein a connection between the seal lip and the exterior side wall portion is a single connection.

9. The weather strip according to claim 1, wherein a thickness of the main portion of the exterior side wall portion is substantially the same as a thickness of the base bottom portion.

10. The weather strip according to claim 1,
wherein a maximum cross-sectional thickness of the joining portion is larger than the cross-sectional thickness of the main portion of the exterior side wall portion.

11. An attachment structure of a weather strip made of a polymer material,
the weather strip including an attachment portion formed in a shape having an exterior side wall portion, an interior side wall portion, and a base bottom portion connecting together both the side wall portions so as to be attached to a flange provided along the circumferential edge of an opening of a vehicle body formed by a plurality of panels, and a sealing portion provided at one of the side wall portions or the base bottom portion of the attachment portion, and the weather strip being arranged between the circumferential edge of the opening and a lid capable of opening and closing the opening of the vehicle body to seal a gap between the circumferential edge of the opening and the lid,
wherein the weather strip is arranged so as to intersect a portion joined by overlapping the plurality of panels, and is provided with a tip projection portion which projects onto an extension line of the exterior side wall portion from the tip of the exterior side wall portion of the attachment portion, and
wherein the tip projection portion is formed from a material which can deform more easily than a material forming the sealing portion, and the tip projection portion is formed in a shape which becomes thin towards a projecting direction with a width dimension which does not exceed the thickness of the tip of the exterior side wall portion in a cross section along the width direction of the attachment portion,
wherein the tip of the exterior side wall portion is formed with a joining portion that includes a joining surface joined to the tip projection portion,
wherein the projecting direction is the same as a direction in which the weather strip is attached to the flange,
wherein the joining surface and the tip projection portion extend both more interior and more exterior, in a width direction of the exterior side wall portion, than a main portion of the exterior side wall portion,
when the attachment portion is attached to the flange, the tip projection portion comes into contact with the panels from its tip, and compressively deforms gradually in the projecting direction so as to be broadened in the width direction of the attachment portion so that a width dimension after deformation becomes greater than a width dimension before the deformation, and the tip projection portion stretches in the longitudinal direction of the attachment portion and comes into contact with the panels.

12. The attachment structure according to claim 11, wherein the weather strip further comprises a seal lip that projects toward an exterior side of the weather strip and projects downward,
wherein a connection between the seal lip and the exterior side wall portion is a single connection.

13. The attachment structure according to claim 11, wherein a thickness of the main portion of the exterior side wall portion is substantially the same as a thickness of the base bottom portion.

14. The attachment structure according to claim 11,
wherein a maximum cross-sectional thickness of the joining portion is larger than the cross-sectional thickness of the main portion of the exterior side wall portion.

* * * * *